United States Patent [19]

Inoue et al.

[11] Patent Number: 5,787,471
[45] Date of Patent: Jul. 28, 1998

[54] CACHE MEMORY MANAGEMENT APPARATUS HAVING A REPLACEMENT METHOD BASED ON THE TOTAL DATA RETRIEVAL TIME AND THE DATA SIZE

[75] Inventors: Shinji Inoue, Neyagawa; Takashi Kakiuchi, Higashi-Osaka; Hiroki Nakamura, Osaka; Masahiro Ooashi, Hirakata, all of Japan

[73] Assignee: Matsushita Electric Industrial Co., Ltd., Osaka-fu, Japan

[21] Appl. No.: 814,600

[22] Filed: Mar. 10, 1997

Related U.S. Application Data

[63] Continuation of Ser. No. 301,476, Sep. 7, 1994, abandoned.

[30] Foreign Application Priority Data

Sep. 8, 1993 [JP] Japan ................................. 5-223360

[51] Int. Cl.$^6$ .................................................. G06F 12/12
[52] U.S. Cl. ...................... 711/133; 711/134; 711/159; 395/200.77
[58] Field of Search ........................ 711/133, 134, 711/135, 159, 160; 395/888, 200.77

[56] References Cited

U.S. PATENT DOCUMENTS

| | | | |
|---|---|---|---|
| 3,675,215 | 7/1972 | Arnold et al. | 711/171 |
| 4,467,421 | 8/1984 | White | 711/118 |
| 5,131,087 | 7/1992 | Warr | 711/113 |
| 5,237,681 | 8/1993 | Kagan et al. | 707/104 |
| 5,377,345 | 12/1994 | Chang et al. | 711/118 |
| 5,379,424 | 1/1995 | Morimoto et al. | 707/2 |

FOREIGN PATENT DOCUMENTS

| | | |
|---|---|---|
| 1125641 | 5/1989 | Japan. |
| 358151 | 3/1991 | Japan. |
| 3177946 | 8/1991 | Japan. |

OTHER PUBLICATIONS

Douglas W. Cornell and Philip S. Yu. "Integrated Approach to Buffer Management and Query Optimization", Computer Systems Science and Engineering, Oct. 1990, vol. 5, No. 4, pp. 243–251.
Anant Agarwal, Analysis of Eache Performance for Operating Systems and Multiprogramming, Kluwer Academic Publishers, 1989, pp. 48–54 & pp. 159–163.

*Primary Examiner*—Eddie P. Chan
*Assistant Examiner*—Hong C. Kim
*Attorney, Agent, or Firm*—Price, Gess & Ubell

[57] ABSTRACT

In a cache memory management device, a time measuring unit measures a time period required to obtain data from a database. The data obtained from the database is linked to the time information and both are stored in a data cache unit. If the data cache does not have sufficient room to store the data obtained from the database, a data replacement determination is made. In one embodiment, the data is replaced by referring to the total data access time. In a second embodiment, if a statistics processing unit judges that the access time and the size of each data are proportional to each other, then cache data is replaced by referring to the size information from a size calculation unit. If, however, the statistics processing unit judges that the access time and the size of each data are not proportional to each other, cache data is replaced by referring to the time information from the time measuring unit.

7 Claims, 6 Drawing Sheets

CACHE MEMORY MANAGEMENT APPARATUS HAVING A REPLACEMENT METHOD BASED ON THE TOTAL DATA RETRIEVAL TIME AND THE DATA SIZE

This is a continuation of application Ser. No. 08/301,476 filed on Sep. 7, 1994 now abandoned.

BACKGROUND OF THE INVENTION

(1) Field of the Invention

The present invention relates to a memory management device equipped with a so-called caching system to be used as a temporary storage which enhances retrievablity efficiency of data from a database.

(2) Description of the Related Art

Because of the development of high performance computers, various data such as a text, graphic, or image data have been commonly stored in a database. Also, the development of a distributed database in which data is stored across two or more computer systems which are linked to a computer network has attracted researchers' attention.

FIG. 1 shows an example of the conventional memory management device. The conventional memory management device in FIG. 1 includes a database 41, a data management unit 42, a data obtaining unit 43, a data reference management unit 44, a data cache unit 45, and a residence priority application unit 46 (Laid-Open Patent Application No. 1-125641).

According to the conventional memory management device, in response to a data reference request derived from the user's program, the data management unit 42 outputs cache data if it is found in the data cache unit 45. If the requested data is not found in the data cache unit 45, the data management unit 42 activates the data obtaining unit 43 to obtain the requested data and outputs it. The newly obtained data is stored in the data cache unit 45. The data reference management unit 44 manages reference information about data stored in the data cache unit 45.

The data cache unit 45 can store only a predetermined amount of data. Accordingly, if the data management unit 42 tries to store more than a predetermined amount of data into the data cache unit 45, the data cache unit 45 operates a so-called LRU (Last Recently Used) algorithm on reference information managed by the data reference management unit 44 to replace the last recently used data, which had not been referred to for the longest period, with newly obtained data. Frequently retrieved data is, however, provided with residence priority by the residence priority, application unit 46, and data with residence priority will not be exposed to such replacement.

Thus, according to the conventional memory management device, a data access time is improved by preventing replacement of frequently retrieved data with another data in the data cache unit 45 by the application of residence priority.

At the same time, however, the conventional memory management device has the problem in that it is necessary to know which data is to be provided with residence priority. Also, the time a computer takes to retrieve each piece of data is not considered; accordingly, data which needs a longer access time is possibly replaced with data which needs a shorter access time. As a result, the total access time is extended. Moreover, the conventional memory management device cannot respond well to a dynamic change in the operating environment which affects the total access time, such as a change in the sort of database to be accessed, in the format of data to be stored in database, in the construction of database, or in the connection method.

SUMMARY OF THE INVENTION

Accordingly, it is an object of the present invention to provide a memory management device capable of managing a cache data replacement effectively without providing a residence priority to data beforehand.

It is another object of the present invention to provide a memory management device which responds well to a dynamic change in the operating environment which affects the access time.

It is a further object of the present invention to provide a memory management device which can reduce the total access time.

The objects may be fulfilled by a memory management device by which an access time of a database is reduced, the memory management device comprising a data obtaining unit for obtaining data from a database which stores various sorts of data, a time measuring unit for measuring how long it takes for the data obtaining unit to obtain the data, and making it time information, a data cache unit for relating the data obtained by the data obtaining unit with the time information measured by the time measuring unit, and storing the data and the time information as cache data, a data management unit for, in response to a data reference request from a user's program, outputting requested cache data if it is stored in the data cache unit, while activating the data obtaining unit to obtain the requested cache data from a database if it is not stored in the data cache unit, and outputting the requested cache data from the database to the user's program, and a cache control unit for operating a replacement to the cache data in the data cache unit as referring to the time information if the amount of the cache data has reached a predetermined number, while storing data which is newly acquired into the data cache unit if the amount of the cache data is less than the predetermined number.

In this construction, it is possible to store data which is newly referred to and takes long to place into the data cache unit, whereby effective replacement control can be achieved without providing residence priority to the data beforehand.

Also, for each data, the time taken to obtain is measured, and the replacing of data is controlled according to such time information. Accordingly, a dynamic change in the operating environment which affects the data obtaining time can be responded to well, such as in access switching to database which has a different data format, or in a traffic jam of a server which includes a line.

The data obtaining unit may comprise a data access unit for accessing the database to obtain the requested data, and outputting it to the data management unit, a time measuring direction unit for directing the time measuring unit to start its measuring when the data access unit starts its access to the database, and for directing the time measuring unit to stop its measuring when the requested cache data is obtained from the database, and a data processing unit for relating the data from the database with the time information from the time measuring unit, and storing them into the data cache unit.

The data obtaining unit may further comprise a compression/expansion unit for compressing/expanding the data from the database to generate data which is suitable for the user's program, in which the time measuring direction unit directs the time measuring unit to stop its measuring after the compression/expansion operation.

The cache control unit may comprise a judge unit for judging if the amount of the cache data has reached the predetermined number, a detection unit for detecting the cache data which was obtained in the shortest time among every cache data when the judge unit judges that the amount of the cache data has reached the predetermined number; and a replacing unit for replacing the detected cache data with the shortest time with newly obtained data according to the detection result from the detection unit.

The above objects may be fulfilled by a memory management device by which an access time of a database is reduced, the memory management device comprising a data obtaining unit for obtaining data from a database which stores various sorts of data, a size calculation unit for calculating the size of the obtained data, a data cache unit for storing the data obtained by the data obtaining unit as cache data, a data management unit for, in response to a data reference request from a user's program, outputting requested cache data if it is stored in the data cache unit, while activating the data obtaining unit to obtain the requested cache data from a database if it is not stored in the data cache unit, and outputting the requested cache data from the database to the user's program, and a cache control unit for replacing the cache data in the data cache unit as referring to the size information from the size calculation unit if the amount of the cache data has reached a predetermined number, while storing data which is newly acquired into the data cache unit if the amount of the cache data is less than the predetermined number.

The data obtaining unit may comprise a data access unit for accessing the database to obtain the requested data, and outputting it to the data management unit, and a data processing unit for relating the data from the database with the size information from the size calculation unit, and storing them into the data cache unit.

The data obtaining unit may comprise a compression/expansion unit for compressing/expanding the data from the database to generate data which is suitable for the user's program, in which the size calculation unit calculates the size of the data after the compression/expansion operation.

The cache control unit may comprise a judge unit for judging if the amount of the cache data has reached the predetermined number, a detection unit for detecting cache data which has the smallest data size among every cache data when the judge unit judges that the amount of the cache data has reached the predetermined number, and a replacing unit for replacing the detected cache data which has the smallest data size among every cache data with newly obtained data according to the detection result from the detection unit.

The cache control unit may comprise a judge unit for judging if the amount of the cache data has reached the predetermined number, a size calculation activation unit for activating the size calculation unit to calculate the size of cache data when the amount of the cache data has reached the predetermined number, and a detection unit for detecting cache data which has the smallest data size among every cache data when the judge unit judges that the number of the cache data has reached the predetermined amount, and a replacing unit for replacing the detected cache data which has the smallest data size with newly obtained data according to the detection result from the detection unit.

Generally, under the stable operating environment, such as in accessing to the same database, the size of data is proportional to the time taken to obtain it. Also, calculation of the data size is conducted more easily than measuring of the data obtaining time. Therefore, under the stable operating environment, data which is newly acquired and takes long to obtain can be stored in the data cache unit in accordance with the size information; accordingly, replacement control can be done easily and effectively without proving a residence priority to data beforehand. For this reason, the total access time to the database can be reduced.

The above objects may be fulfilled by a memory management device by which an access time of a database is reduced, the memory management device comprising a data obtaining unit for obtaining data from a database which stores various sorts of data, a time measuring unit for measuring how long it takes for the data obtaining unit to obtain the data, and making it the time information, a size calculation unit for calculating the size of the data, and making it the size information, a statistics processing unit for judging if the time from the time measuring unit and the size from the size calculation unit are proportional to each other, a data cache unit for storing the data obtained by the data obtaining unit as cache data, a data management unit for, in response to a data reference request from a user's program, outputting requested cache data if it is stored in the data cache unit, or activating the data obtaining unit to obtain the requested cache data from a database if it is not stored in the data cache unit, and outputting the requested cache data from the database to the user's program, and a cache control means for, when the amount of the cache data in the data cache unit has reached the predetermined number, replacing cache data as referring to the size information from the size calculation unit if the statistics processing unit judges that the time and the size of each data are proportional to each other, while replacing cache data as referring to the time information from the time measuring unit if the statistics processing unit judges that the time and the size of each data are not proportional to each other.

The statistics processing unit may comprise a time and size storing unit for storing time measured by the time measuring unit and size calculated by the size calculating unit and a statistics judge unit for processing what is stored in the time and size storing unit statistically to judge if the time and the size of each data are proportional to each other, and a replacement control selection unit for directing to replace the cache data as referring to the size information when the time measured by the time measuring unit and the size calculated by the size calculation unit are proportional to each other, while directing to replace the cache data as referring to the time information when the time measured by the time measuring unit and the size calculated by the size calculation unit are not proportional to each other.

Thus, it is judged by the statistics judge unit if data access is conducted under the stable operating environment. If so, replacement control is operated according to the size information; otherwise, it is operated according to the time information.

Because of the above construction, under the stable operating environment, data which is newly obtained or has taken long to obtain can be stored in the data cache unit as referring to the size information, whereby replacement can be controlled easily and effectively without providing residence priority to the data beforehand.

When the statistics judge unit detects the unstable operating environment, on the other hand, replacement is controlled as referring to the time information. Thus, a dynamic change in the operating environment which affects the data obtaining time can be responded to well, such as in the automatic access switching to database having a different data format, or in a traffic jam of a server including a line. As a result, the total access time to database can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
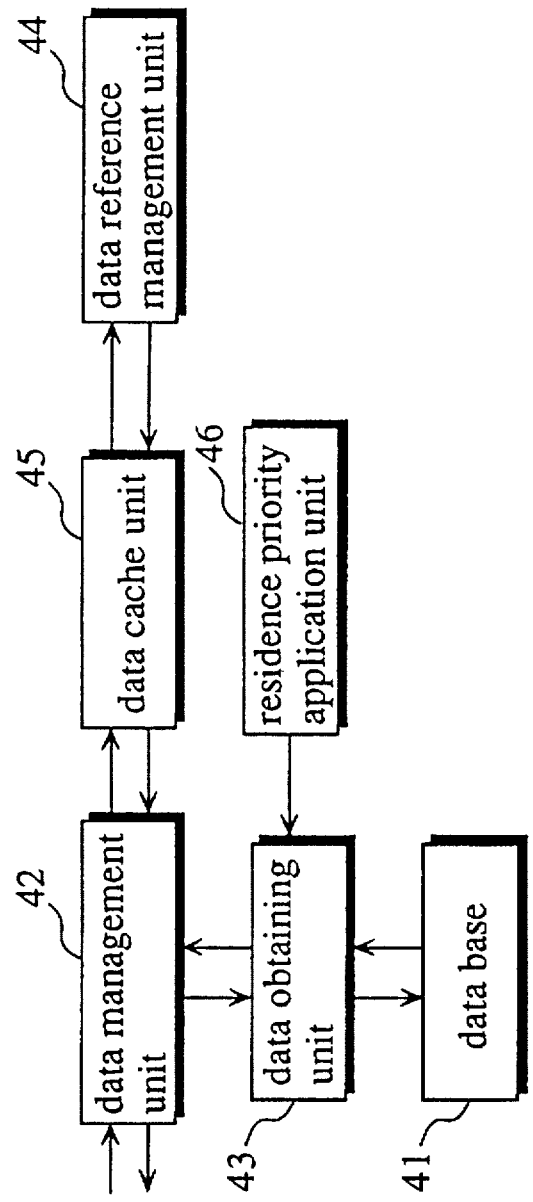
FIG. 1 shows the configuration of a conventional memory management device.

Embodiments of the present invention are described hereunder as referring to the drawings.

Embodiment 1

Figure 2:
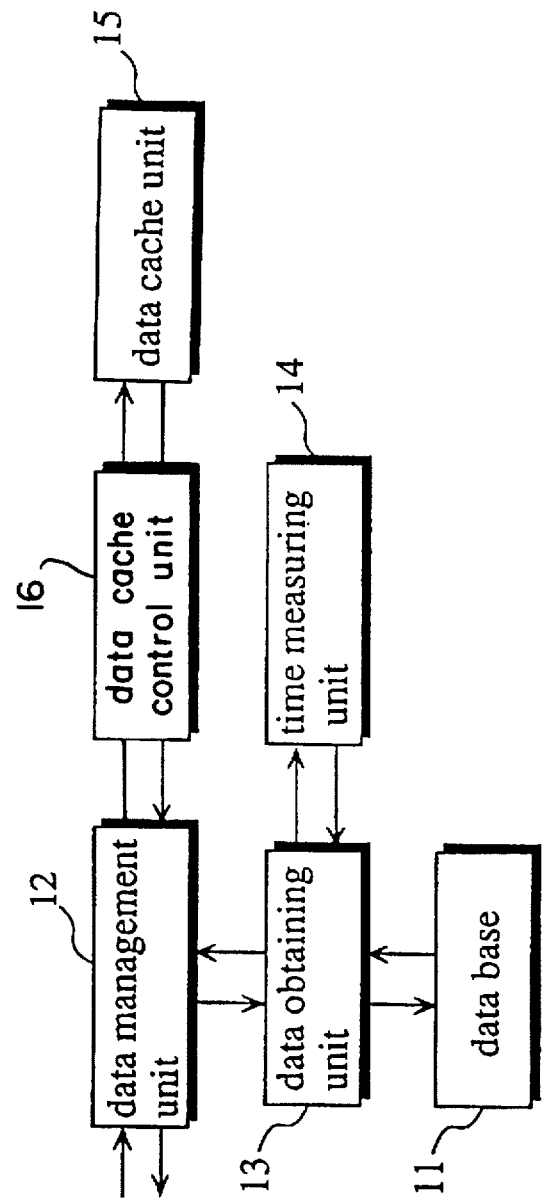
FIG. 2 shows the configuration of a memory management device in a first embodiment of the present invention.

FIG. 2 shows the configuration of a memory management device in a first embodiment of the present invention. The memory management device in FIG. 2 comprises a database 11, a data management unit 12, a data obtaining unit 13, a time measuring unit 14, a data cache control unit 16, and a data cache unit 15.

Various sorts of data is stored in the database 11. Responsive to a data reference request from the user's program, the data management unit 12 outputs the requested data from the data cache unit 15 to the user's program. If requested data is not found in the data cache unit 15, then the data management unit 12 activates the data obtaining unit 13 to obtain the requested data, and outputs it to the user's program. Only when data was obtained by the data obtaining unit 13, the data management unit 12 stores the data into the data cache unit 15. The data obtaining unit 13 obtains data from the database 11. The time measuring unit 14 times how long it takes for the data obtaining unit 13 to obtain requested data. The data cache unit 15 stores data obtained by the data obtaining unit 13 with the time information received from the time measuring unit 14 as cache data, and when the amount of cache data the data cache unit 15 is trying to store, which is the sum of data already present there and data to be newly stored, exceeds a predetermined number, the data cache unit 15 operates replacement to cache data as referring to the time information. To count the amount of data in the database 11, the user's application program determines one unit of data.

The cache control means 16 controls a replacement of the cache data in the data cache 15 by referring to the time information if the amount of the cache data has reached a predetermined number, while storing the data which is newly acquired into the data cache means without a replacement if the amount of the cache data is less than the predetermined number.

Figure 3:
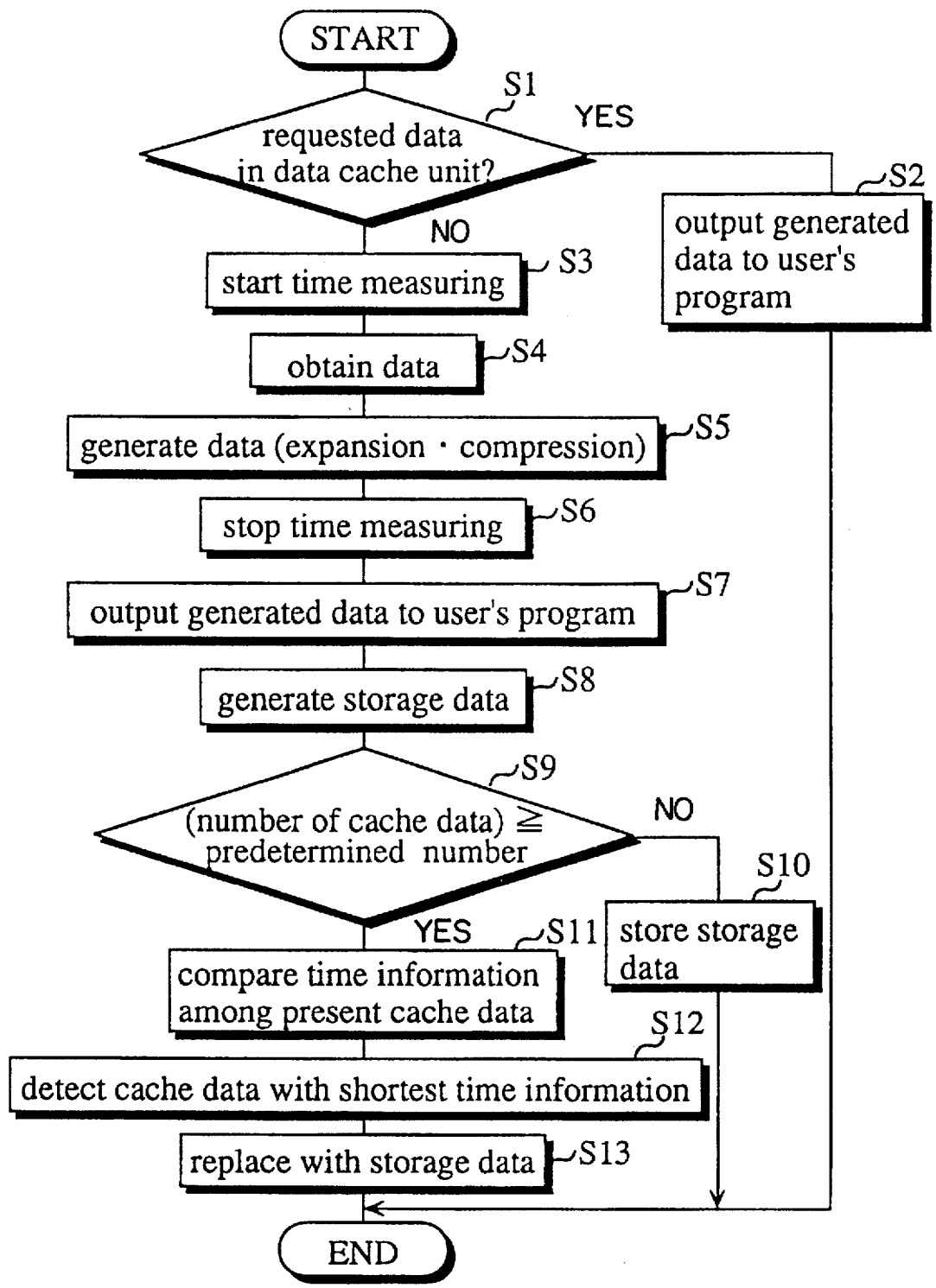
FIG. 3 is a flow chart depicting the operation of the memory management device in FIG. 2.

The operation of the thus constructed memory management device is described as referring to FIG. 3.

Responsive to a data reference request from the user's program, the data management unit 12 determines if the requested data is present in the data cache unit 15 (Step 1).

When the requested data is found in the data cache unit 15, the data management unit 12 outputs it to the user's program (Step 2).

When the requested data is not found, then the data management unit 12 directs the data obtaining unit 13 to obtain it from the database 11. When receiving a direction from the data management unit 12, the data obtaining unit 13 directs the time measuring unit 14 to start to time the data obtaining unit 13. Responsive to a direction from the data obtaining unit 13, the time measurement unit 14 starts to time the data obtaining unit 13 (Step 3).

The data obtaining unit 13 obtains requested data from the database 11 (Step 4).

The data obtaining unit 13 operates data conversion depending on needs; for example, if the data format of the database 11 does not agree with that of the user's program, data of the corresponding data format is generated being based upon obtained data (Step 5).

When completing to generate data, the data obtaining unit 13 directs the time measuring unit 14 to stop timing. Responsive to a direction from the data obtaining unit 13, the time measuring unit 14 stops timing the data obtaining unit 13 (Step 6).

The data obtaining unit 13 adds time information from the time measuring unit 14 to the generated data, and outputs them to the data management unit 12. The data management unit 12 outputs generated data from the data obtaining unit 13 to the user's program (Step 7); at the same time it relates the generated data to the time information, then outputs them as storage data to the data cache unit 15 (Step 8).

The data cache unit 15 determines if the number of cache data, which is the sum of data already present there and data to be newly stored, exceeds a predetermined number (Step 9).

If this number is within a predetermined number, the data cache unit 15 stores data newly outputted from the data management unit 12 with its time information (Step 10).

If this number had reached a predetermined number, on the other hand, the data cache unit 15 compares the time information of every cache data already stored (Step 11), and finds data of the shortest access time (Step 12), and replaces it with data to be newly stored (Step 13).

Thus, whenever the database 11 is accessed for data, the access is timed, and the replacement of the cache data is controlled according to time information. Thereby, effective data access is achieved, and the total access time to the database can be reduced.

Data conversion such as conversion of Chinese character codes or conversion of formats may be performed at Step 5 besides data compression and expansion.

Although the time measuring unit 14 is controlled by the data obtaining unit 13 in this embodiment, it can be controlled by the data management unit 12 instead.

Embodiment 2

Figure 4:
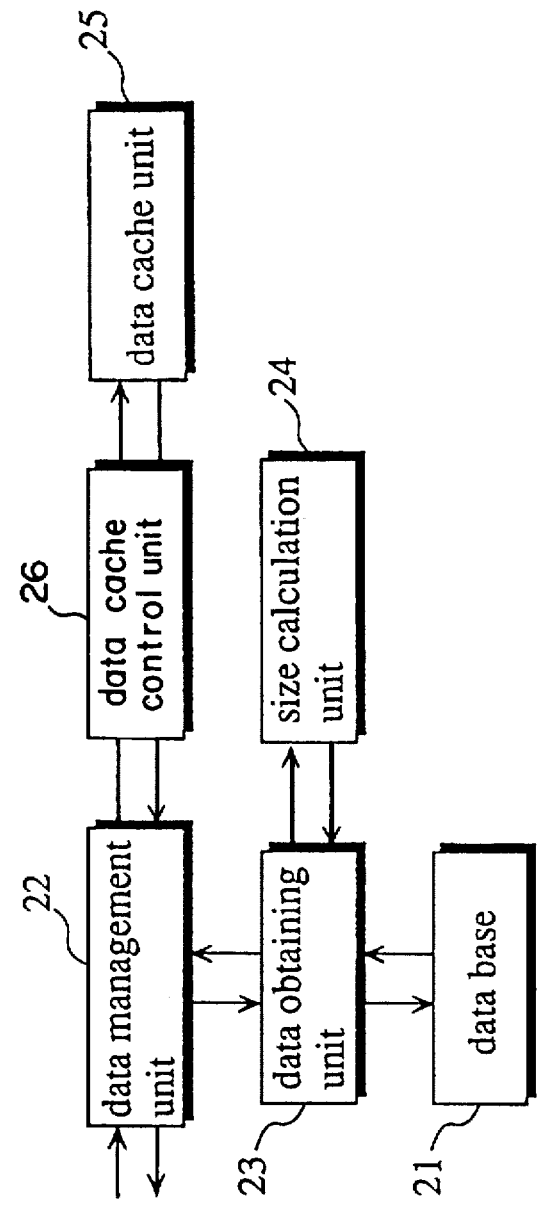
FIG. 4 shows the configuration of a memory management device in a second embodiment of the present invention.

FIG. 4 shows the configuration of a memory management device in a second embodiment of the present invention. The memory management device in FIG. 4 comprises a database 21, a data management unit 22, a data obtaining unit 23, a size calculation unit 24, a data cache control unit 26, and a data cache unit 25.

Various sorts of data are stored in the database 21. Responsive to a data reference request from the user's program, the data management unit 22 outputs the requested data from the data cache unit 25 to the user's program. If the requested data is not found in the data cache unit 25, then the data management unit 22 activates the data obtaining unit 23 to obtain the requested data and outputs the requested data to the user's program. Only when data is obtained by the data obtaining unit 23, the data management unit 22 stores it into the data cache unit 25. The data obtaining unit 23 obtains data from the database 11. The size calculation unit 24 calculates the size of data obtained by the data obtaining unit 23. The data cache unit 25 stores data obtained by the data obtaining unit 23 as cache data, and when the number of cache data the data cache unit 25 is trying to store, which is the sum of data already present there and data to be newly stored, exceeds a predetermined number, the data cache unit 25 operates replacement of the cache data by referring to the size information calculated by the size calculation unit 24.

The operation of the thus constructed memory management device is described. Responsive to a data reference request from the user's program, the data management unit 22 determines if the requested data is present in the data cache unit 25. When the requested data is found in the data cache unit 25, the data management unit 22 outputs it to the user's program. When requested data is not found, then the data management unit 22 directs the data obtaining unit 23 to obtain the data from the database 21.

Responsive to a size calculation direction, the size calculation unit 24 calculates the size of the inputted data, and outputs the calculating result to the data obtaining unit 23. Various calculation methods are applicable. For example, a corresponding value may be retrieved from a table, or the product of the length and the width may be calculated if the inputted data is image data.

Responsive to a data obtaining direction from the data management unit 22, the data obtaining unit 23 obtains the requested data from the database 21. Also, depending on needs, the data obtaining unit 23 compresses/expands the obtained data to generate appropriate data. Completing to generate data, the data obtaining unit 23 directs the size calculation unit 24 to calculate the size of the generated data. Then, the size information from the size calculation unit 24 is added to the generated data, and they are outputted to the data management unit 22.

The data management unit 22 outputs the generated data from the data obtaining unit 23 to the user's program, and at the same time relates the generated data to its size information, then outputs them to the data cache unit 25.

The cache control means 26 controls a replacement of the cache data in the data cache 25 by referring to the time information if the amount of the cache data has reached a predetermined number, while storing the data which is newly acquired into the data cache means without a replacemnet if the amount of the cache data is less than the predetermined number.

Until a predetermined number is reached, the data cache unit 25 stores data newly outputted from the data management unit 22 with its size information. When the number of data sent from the data management unit 22 exceeds a predetermined number, the data cache unit 25 replaces the cache data having the smallest size among all of stored data with the newly received data.

It is considered that the access time is nearly proportional to the data size if data shares the same format, and it is from the same database, as well as if data has been compressed according to the same compression algorithm. To be proportional, the operating environment must be stable, such as traffic conditions of a server including a line (i.e., the requests are queued). In addition, the data size is calculated upon each transfer of data, besides upon each access to the database; accordingly, calculation result can be employed in each transfer occasion.

Thus, effective data access is achieved by calculating the data size, and controlling replacement according to the calculation result. Further, since calculating the data size is easier than timing the data obtaining unit, the efficiency of replacement controlling is enhanced.

Although the size calculation unit 24 is controlled by the data obtaining unit 23 in the second embodiment, it can be controlled by the data management unit 22.

Also, instead of storing size information in the data cache unit 25 together with generated data, size information can be calculated upon each replacement.

Embodiment 3

Figure 5:
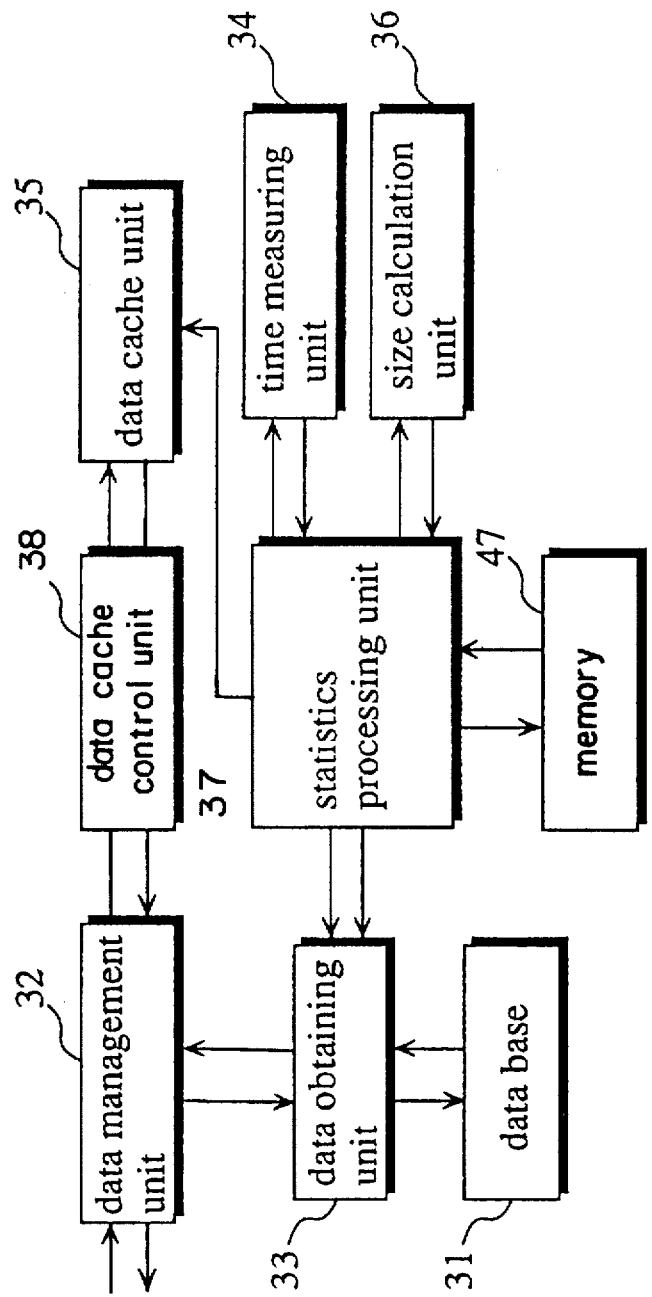
FIG. 5 shows the configuration of a memory management device in a third embodiment of the present invention.

FIG. 5 shows the configuration of a memory management device in a third embodiment of the present invention. The memory management device in FIG. 5 comprises a database 31, a data management unit 32, a data obtaining unit 33, a time measuring unit 34, a data cache unit 35, a size calculation unit 36, a data cache control unit 38, and a statistics processing unit 37.

Various sorts of data are stored in the database 31. Responsive to a data reference request from the user's program, the data management unit 32 outputs the requested data from the data cache unit 35 to the user's program. If requested data is not found in the data cache unit 35, then the data management unit 32 activates the data obtaining unit 33 and outputs data obtained by the data obtaining unit 33 to the user's program. Only when data is newly obtained by the data obtaining unit 33, the data management unit 32 stores it into the data cache unit 35. The data obtaining unit 33 obtains data from the database 31.

The time measuring unit 34 times how long it takes for the data obtaining unit 33 to obtain the requested data according to a sampling cycle of the statistics processing unit 37.

The data cache unit 35 relates data from the data obtaining unit 33 to its time information from the time measuring unit 34, and stores them as cache data. When the number of cache data the data cache unit 35 is trying to store, which is the sum of data already present there and data to be newly stored, exceeds a predetermined number, the data cache unit 35 operates replacement of the cache data by referring to the size information from the size calculation unit 36 if the statistics processing unit 37 judges that the access time and the size of data are proportional to each other, or operates replacement to cache data by referring to the time information if the statistics processing unit 37 judges that the access time and the size of data are not proportional to each other.

The size calculation unit 36 calculates the size of the data obtained by the data obtaining unit 33.

The statistics processing unit 37 has a memory 47 for storing time information and size information. The statistics processing unit 37 sets a certain period to be a statistics cycle and stores the time measured by the time measuring unit 34 and the size calculated by the size calculation unit 36 in the memory 47, and processes them statistically to judge if the time and the size of the data are proportional to each other.

As an example, the statistics processing unit 37 calculates the amount of data obtained per a time unit from the measured time and the calculated size in the memory 47. Then, the statistics processing unit 37 processes them statistically to judge if they are proportional to each other.

The operation of the thus constructed memory management device is described. When receiving a data reference request from the user's program, the data management unit 32 judges if the requested data is present in the data cache unit 35 or not, and outputs requested data to the user's program if it is present. If it is not stored in the data cache unit 35, then the data management unit 32 directs the data obtaining unit 33 to obtain the requested data from the database 31.

According to the sampling cycle, the statistics processing unit 37 directs the time measuring unit 34 to start to time the data obtaining unit 33. Responsive to a direction, the time measuring unit 34 starts to time. When directed to stop timing, then, the time measuring unit 34 stops timing and outputs the result of the time measuring operation.

When receiving a size calculation direction, the size calculation unit 36 calculates the size of the inputted data, and outputs a calculation result. Various calculation methods are applicable. For example, a corresponding value may be retrieved from a table, or the product of the length and the width may be calculated if the inputted data is image data.

When receiving a data obtaining direction from the data management unit 32, the data obtaining unit 33 directs the time measuring unit 34 to start to time the data obtaining unit 33 via the statistics processing unit 37. Then, the data obtaining unit 33 obtains requested data from the database 31. Further, depending on needs, the data obtaining unit 33 applies data conversion, such as compression/expansion, to the obtained data so as to generate appropriate data. When completing to generate the data, the data obtaining unit 33 directs the time measuring unit 34 to stop timing and at the same time directs the size calculation unit 36 to calculate the data size, then outputs generated data together with the time information and the data size information to the data management unit 32.

The statistics processing unit 37 sets a certain period to be a statistics cycle. The statistics processing unit 37 calculates the amount of data obtained per a time unit from the measured access time and the calculated data size in the memory 47; then it processes them statistically to judge if the access time and data size are proportional to each other.

If the access time and the data size are proportional to each other, the statistics processing unit 37 directs the data cache unit 35 to control replacement according to the size information. Otherwise, the data cache unit 35 is directed to control replacement according to the time information. Also, the statistics processing unit 37 informs the data obtaining unit 33 what information, either the time information or the size information, is referred to in the currently operated replacement.

The data management unit 32 outputs the generated data outputted from the data obtaining unit 33 to the user's program, at the same time relates generated data to additional information of the time information and the size information, and outputs them to the data cache unit 35.

Unless the number of data already stored and to be newly stored exceeds a predetermined number, the data cache unit 35 stores generated data together with its time information and size information received from the data management unit 32. If the above number exceeds a predetermined number, on the other hand, data having the smallest data size in the cache unit 35 is replaced with data newly outputted from the data management unit 32. Thus, if the statistics processing unit 37 directs replacement controlling according to the time information, data having the shortest time information in the data cache unit 35 is replaced; and if the statistics processing unit 37 directs replacement controlling according to the size information, data of the smallest size information is replaced.

The cache control means 38 controls a replacemnet of the cache data in the data cache 35 by referring to the time information if the amount of the cache data has reached a predetermined number, while storing the data which is newly acquired into the data cache means without a replacement if the amount of the cache data is less than the predetermined number.

Thus, in this embodiment, replacement of the cache data is controlled according to the data size if the access time and data size are proportional to each other; and it is controlled according to the access time if the access time and data size are not proportional to each other. As a result, memory management can respond well to a dynamic change in the operating environment, as well as the efficiency of the data access is enhanced.

Although the size information is stored in the data cache unit 35 together with generated data, size information may be calculated upon each replacement instead of being stored in the data cache unit 35.

Figure 6:
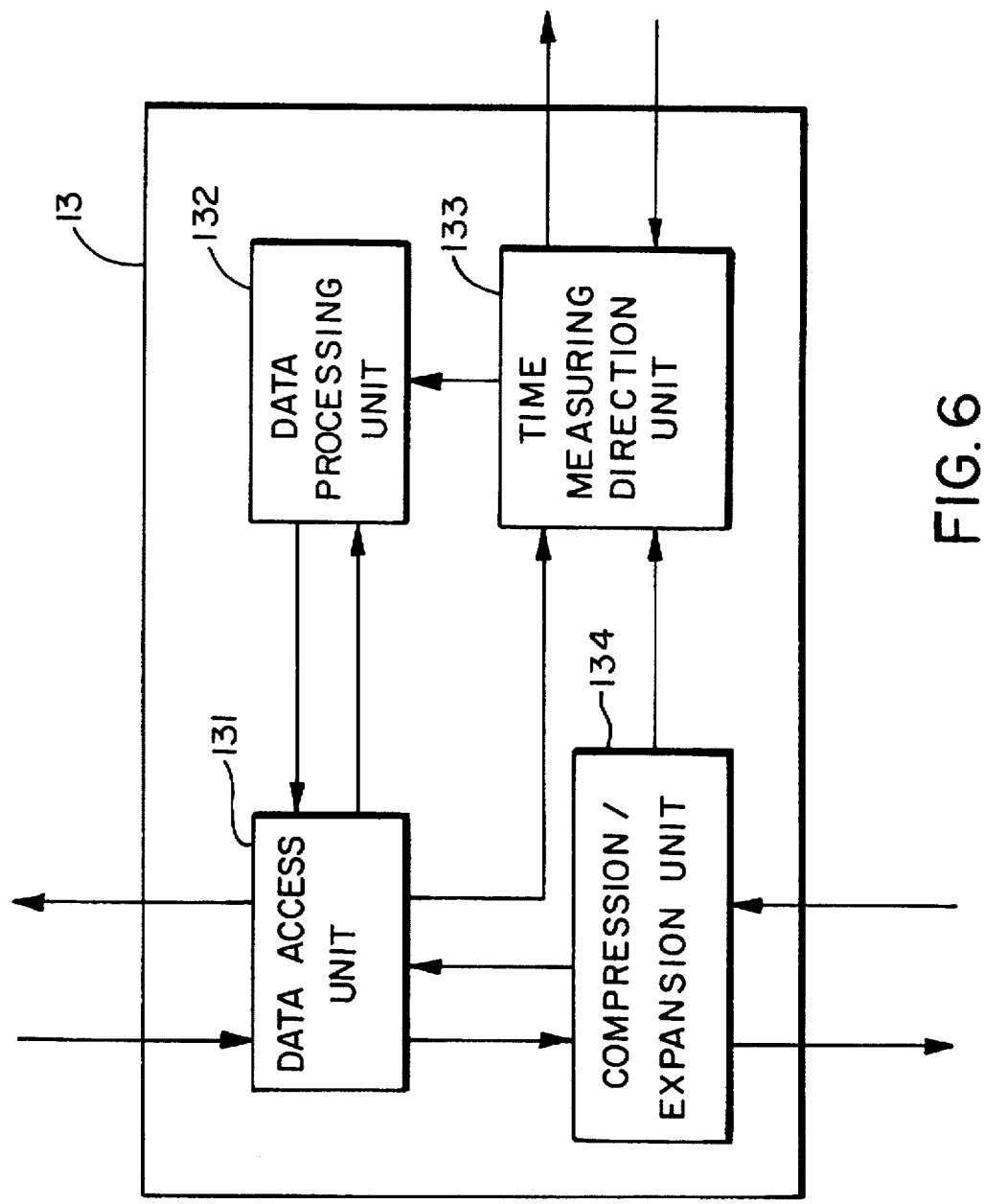
FIG. 6 shows a configuration of the data obtaining unit.

FIG. 6 illustrates one embodiment of the data obtaining unit 13 (or data obtaining unit 23 or 33). A data access unit 131 controls access to the database 11 and outputs the data to the data management unit 12. A compression/expansion unit 134 expands the data from the database 11 into a form as required by a user's program and compresses data stored into the database 11 in order to efficiently store the data. A time measuring direction unit 133 directs the time measuring unit 14 to start measuring a time period when the data access unit 131 begins accessing the database 11. The time measuring direction unit 133 also directs the time measuring unit 14 to stop measuring the time period when the requested data is obtained from the database 11. The time period taken by the compression/expansion unit 134 to perform its function may be included in the time period measured by the time measuring unit 14.

A data processing unit 132 associates data from the database 11 with time information determined by the time measuring unit 14. This combined information is then stored in the data cache unit 15.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A memory management device for reducing database access time, the memory management device comprising:
   a data obtaining means for obtaining data from a database;
   a time measuring means for measuring a time period for obtaining data from the database by the data obtaining means and for converting the measured time period into time information, wherein the time measuring means measures an entire time taken by the data obtaining means to obtain the data, including the time to access the database, to retrieve the data, and to convert or manipulate the data into an appropriate format;
   a data cache means for linking the data obtained by the data obtaining means with the time information measured by the time measuring means, and for storing the data and the time information as cache data;
   a data management means for managing a data request from a user's program, wherein the data management means outputs the requested data from the data cache means to the user's program if the requested data is stored in the data cache means and, if the requested data is not stored in the data cache means, the data management means activates the data obtaining means to obtain the requested data from the database and outputs the requested data to the user's program; and a cache control means for controlling the data stored in the data cache means based on the time information stored with the data, wherein, if the data cache means has a necessary space to store the data obtained by the data obtaining means, the data is stored in the data cache means without replacing any data, but if the data cache means lacks the necessary space to store the data obtained by the data obtaining means, then data stored in the data cache means having a lowest time information is replaced by the data obtained by the data obtaining means.

2. The memory management device of claim 1, further comprising:

a size calculation means for calculating the size of the data, and for converting the calculated size into size information, wherein the cache control means controls a replacement of data stored in the cache based on both the time information and the size information.

3. A memory management device by which an access time of a database is reduced, the memory management device comprising:

a data obtaining means for obtaining data from a database which stores various sorts of data, the data obtaining means comprising:

a data access unit for accessing the database to obtain requested data, and outputting the data to the data management means;

a time measuring direction unit for directing a time measuring means to start measuring the time period when the data access unit starts accessing the database and for directing the time measuring means to stop measuring when the requested cache data is obtained from the database;

a data processing unit for relating the data from the database with the time information from the time measuring means, and storing both the data from the database and the time information into the data cache means; and a compression/expansion unit for compressing and/or expanding the data from the database to generate data which is suitable for the user's program, and wherein the time measuring direction unit directs the time measuring means to stop measuring after the compression/expansion operation;

a time measuring means for measuring a time period taken by the data obtaining means to obtain the data, and for converting the measured time period into data information;

a data cache means for relating the data obtained by the data obtaining means with the time information measured by the time measuring means, and for storing the data and the time information as cache data;

a data management means for, in response to a data reference request from a user's program, outputting the requested cache data if the data is stored in the data cache means, while activating the data obtaining means to obtain the requested cache data from the database to the user's program; and a cache control means for controlling a replacement of the cache data in the data cache means by referring to the time information if the amount of the cache data has reached a predetermined number, while storing the data which is newly acquired into the data cache means without a replacement if the amount of the cache data is less than the predetermined number.

4. The memory management device of claim 3, wherein the cache control means comprises:

a judge unit for judging if the number of the cache data has reached the predetermined number;

a detection unit for detecting cache data which was obtained in the shortest time among every cache data when the judge unit judges the number of the cache data has reached the predetermined number; and a replacing unit for replacing the detected cache data with the shortest time with newly obtained data according to the detection result from the detection unit.

5. A memory management device by which an access time of a database is reduced, the memory management device comprising:

a data obtaining means for obtaining data from a database which stores various sorts of data;

a time measuring means for measuring a time period taken by the data obtaining means to obtain the data, and for converting the measured time period into time information;

a size calculation means for calculating the size of the data, and for converting the calculated size into size information;

a statistics processing means for judging if the time information from the time measuring means and the size information from the size calculation means are proportional to each other;

a data cache means for storing the data obtained by the data obtaining means as cache data;

a data management means for, in response to a data reference request from a user's program, outputting requested cache data if the data is stored in the data cache means, or activating the data obtaining means to obtain the requested cache data from a database if the data is not stored in the data cache means, and outputting the requested cache data from the database to the user's program; and a cache control means for, when the number of the cache data in the data cache means has reached the predetermined number, replacing cache data by referring to the size information from the size calculation means if the statistics processing means judges that the time and the size of each data are proportional to each other, and for replacing cache data by referring to the time information from the time measuring means if the statistics processing means judges that the time and the size of each data are not proportional to each other.

6. The memory management device of claim 5, wherein the statistics processing means comprises:

a time and size storing unit for storing the time measured by the time measuring means and the size calculated by the size calculating means; and a statistics judge unit for processing the time and the size stored in the time and size storing unit statistically to judge if the time and the size of each data are proportional to each other; and a replacement control selecting unit for directing replacement of the cache data by referring to the size information when the time measured by the time measuring means and the size calculated by the size calculation means are proportional to each other, and for directing replacement of the cache data by referring to the time information when the time measured by the time measuring means and the size calculated by the size calculation means are not proportional to each other.

7. The memory management device of claim 5, wherein the data obtaining means further comprises a compression/expansion unit for compressing and/or expanding the data from the database to generate data which is suitable for the user's program, wherein the time measuring direction unit directs the time measuring means to stop measuring after the compression and/or expansion operation.

* * * * *